United States Patent
Sumner

(10) Patent No.: US 9,204,239 B1
(45) Date of Patent: Dec. 1, 2015

(54) SEGMENTED CUSTOMIZATION PACKAGE WITHIN DISTRIBUTED SERVER ARCHITECTURE

(71) Applicant: Sprint Communications Company L.P., Overland Park, KS (US)

(72) Inventor: Bret D. Sumner, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 110 days.

(21) Appl. No.: 14/010,522

(22) Filed: Aug. 27, 2013

(51) Int. Cl.
*H04W 4/00* (2009.01)

(52) U.S. Cl.
CPC ..................................... *H04W 4/001* (2013.01)

(58) Field of Classification Search
None
See application file for complete search history.

(56) References Cited

U.S. PATENT DOCUMENTS

| | | | |
|---|---|---|---|
| 6,131,024 A | 10/2000 | Boltz | |
| 7,165,191 B1 | 1/2007 | Vakrat | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |
| 8,442,521 B2 | 5/2013 | Fleischman et al. | |
| 8,571,536 B2 | 10/2013 | Urbanek | |
| 8,612,967 B1 | 12/2013 | Delker | |
| 8,626,165 B1 | 1/2014 | Narasimhan et al. | |
| 8,666,383 B1 | 3/2014 | Mauer et al. | |
| 8,825,039 B2 | 9/2014 | Mizuguchi | |
| 8,909,291 B1 | 12/2014 | Spanel et al. | |
| 9,026,105 B2 | 5/2015 | Shipley et al. | |
| 9,042,877 B1 | 5/2015 | Ghoshal et al. | |
| 2002/0091931 A1 | 7/2002 | Quick, Jr. et al. | |

(Continued)

FOREIGN PATENT DOCUMENTS

WO WO2012078753 A1 6/2012
WO WO2013169983 A1 11/2013

(Continued)

OTHER PUBLICATIONS

Advisory Action dated Dec. 17, 2014, U.S. Appl. No. 13/622,234, filed Sep. 18, 2012.

(Continued)

*Primary Examiner* — Jeffrey M Rutkowski
*Assistant Examiner* — Ning Li

(57) ABSTRACT

A method of making customization changes on a mobile communication device, comprises identifying, on the mobile communication device, the bandwidth of a bearer channel of the mobile communication device, and selecting at least one server from which to request a customization payload based at least in part on the bandwidth of the bearer channel of the mobile communication device, wherein different servers are configured to access different portions of the customization package. The method further comprises sending a request for the customization payload to the selected server, receiving the customization payload from the selected server, and performing customization changes on the mobile communication device in response to receiving customization information contained in the customization payload.

20 Claims, 7 Drawing Sheets

(56) References Cited

U.S. PATENT DOCUMENTS

| | | | |
|---|---|---|---|
| 2003/0217145 A1* | 11/2003 | Leung et al. | 709/224 |
| 2004/0033798 A1 | 2/2004 | Robin et al. | |
| 2004/0092248 A1 | 5/2004 | Kelkar et al. | |
| 2004/0093109 A1 | 5/2004 | O'Connor et al. | |
| 2004/0116163 A1 | 6/2004 | Kim et al. | |
| 2004/0137890 A1 | 7/2004 | Kalke | |
| 2004/0137891 A1 | 7/2004 | Clark et al. | |
| 2004/0261041 A1 | 12/2004 | Parakkuth et al. | |
| 2005/0079855 A1 | 4/2005 | Jethi et al. | |
| 2005/0085222 A1 | 4/2005 | Przybilski et al. | |
| 2005/0119001 A1* | 6/2005 | Watanabe | 455/436 |
| 2005/0188262 A1 | 8/2005 | Rosenman et al. | |
| 2005/0197098 A1 | 9/2005 | Trossen | |
| 2006/0025151 A1 | 2/2006 | Karaoguz et al. | |
| 2006/0135144 A1 | 6/2006 | Jothipragasam | |
| 2006/0154651 A1 | 7/2006 | Knowles | |
| 2006/0203722 A1 | 9/2006 | Oommen | |
| 2006/0208071 A1 | 9/2006 | Chang et al. | |
| 2006/0235944 A1 | 10/2006 | Haslam | |
| 2006/0236325 A1 | 10/2006 | Rao et al. | |
| 2006/0246949 A1 | 11/2006 | Gupta et al. | |
| 2007/0004404 A1 | 1/2007 | Buckley et al. | |
| 2007/0082655 A1 | 4/2007 | Link, II et al. | |
| 2007/0099599 A1 | 5/2007 | Smith et al. | |
| 2007/0129057 A1 | 6/2007 | Xu et al. | |
| 2007/0130156 A1 | 6/2007 | Tenhunen et al. | |
| 2007/0165654 A1 | 7/2007 | Chai et al. | |
| 2007/0169084 A1 | 7/2007 | Frank et al. | |
| 2007/0190939 A1 | 8/2007 | Abel | |
| 2007/0197234 A1* | 8/2007 | Gill et al. | 455/458 |
| 2007/0250645 A1 | 10/2007 | Meadows et al. | |
| 2007/0254635 A1 | 11/2007 | Montelius | |
| 2008/0039114 A1 | 2/2008 | Phatak et al. | |
| 2008/0046583 A1 | 2/2008 | Rao | |
| 2008/0046880 A1 | 2/2008 | Jun et al. | |
| 2008/0046997 A1 | 2/2008 | Wang | |
| 2008/0062900 A1 | 3/2008 | Rao | |
| 2008/0065753 A1 | 3/2008 | Rao | |
| 2008/0109662 A1 | 5/2008 | Natarajan et al. | |
| 2008/0146280 A1 | 6/2008 | Sasse et al. | |
| 2008/0167027 A1 | 7/2008 | Gautier et al. | |
| 2008/0171532 A1 | 7/2008 | Shieh et al. | |
| 2008/0225806 A1 | 9/2008 | Arian et al. | |
| 2008/0281511 A1 | 11/2008 | Miyata | |
| 2008/0318547 A1 | 12/2008 | Ballou, Jr. et al. | |
| 2009/0061840 A1 | 3/2009 | Fleischman et al. | |
| 2009/0093242 A1 | 4/2009 | Bhalekar et al. | |
| 2009/0094350 A1 | 4/2009 | Rive et al. | |
| 2009/0106200 A1 | 4/2009 | Salinas et al. | |
| 2009/0124250 A1 | 5/2009 | Topaltzas et al. | |
| 2009/0156209 A1 | 6/2009 | Franklin et al. | |
| 2009/0239518 A1 | 9/2009 | Feuillette | |
| 2009/0247124 A1 | 10/2009 | de Atley et al. | |
| 2009/0260004 A1 | 10/2009 | Datta et al. | |
| 2009/0307763 A1 | 12/2009 | Rawlins et al. | |
| 2010/0048193 A1 | 2/2010 | Ortion et al. | |
| 2010/0060456 A1 | 3/2010 | Forster | |
| 2010/0075669 A1 | 3/2010 | Sparks et al. | |
| 2010/0080143 A1 | 4/2010 | Topaltzas et al. | |
| 2010/0133335 A1 | 6/2010 | Maguid et al. | |
| 2010/0136960 A1 | 6/2010 | Knezevic | |
| 2010/0159876 A1 | 6/2010 | Brown et al. | |
| 2010/0161724 A1 | 6/2010 | Sathyan et al. | |
| 2010/0167696 A1 | 7/2010 | Smith et al. | |
| 2010/0192120 A1 | 7/2010 | Raleigh | |
| 2010/0203864 A1 | 8/2010 | Howard | |
| 2010/0207742 A1 | 8/2010 | Buhot et al. | |
| 2010/0222047 A1* | 9/2010 | Vanderlinden et al. | 455/418 |
| 2010/0262638 A1 | 10/2010 | Fitzgerald | |
| 2010/0291898 A1 | 11/2010 | Sanding et al. | |
| 2010/0311404 A1 | 12/2010 | Shi et al. | |
| 2010/0312794 A1 | 12/2010 | Liu | |
| 2010/0325622 A1 | 12/2010 | Morton | |
| 2010/0332639 A1 | 12/2010 | Diaz et al. | |
| 2011/0003590 A1 | 1/2011 | Yoon et al. | |
| 2011/0014913 A1 | 1/2011 | Yoon et al. | |
| 2011/0026501 A1 | 2/2011 | Sharaga et al. | |
| 2011/0028138 A1 | 2/2011 | Davies-Moore et al. | |
| 2011/0030062 A1 | 2/2011 | Hsu et al. | |
| 2011/0035421 A1 | 2/2011 | Laird-McConnell et al. | |
| 2011/0081885 A1 | 4/2011 | Sennett et al. | |
| 2011/0119716 A1 | 5/2011 | Coleman, Sr. | |
| 2011/0138074 A1 | 6/2011 | Onda et al. | |
| 2011/0161659 A1 | 6/2011 | Himawan et al. | |
| 2011/0165836 A1 | 7/2011 | Dixon et al. | |
| 2011/0208338 A1 | 8/2011 | Eteminan et al. | |
| 2011/0222404 A1* | 9/2011 | Watson et al. | 370/235 |
| 2011/0230136 A1 | 9/2011 | Washiro | |
| 2011/0258249 A1 | 10/2011 | Biggs et al. | |
| 2011/0263294 A1 | 10/2011 | Kim et al. | |
| 2011/0296399 A1 | 12/2011 | Tugnawat et al. | |
| 2011/0306318 A1 | 12/2011 | Rodgers et al. | |
| 2011/0314129 A1* | 12/2011 | Rezaiifar et al. | 709/218 |
| 2012/0027059 A1* | 2/2012 | Zhao et al. | 375/222 |
| 2012/0036282 A1 | 2/2012 | Chen et al. | |
| 2012/0046022 A1 | 2/2012 | Kalke et al. | |
| 2012/0047227 A1 | 2/2012 | Haggerty et al. | |
| 2012/0094684 A1 | 4/2012 | Reddy | |
| 2012/0106509 A1* | 5/2012 | Klingenbrunn et al. | 370/331 |
| 2012/0129513 A1 | 5/2012 | van der Laak | |
| 2012/0129572 A1 | 5/2012 | Johnstone et al. | |
| 2012/0135733 A1 | 5/2012 | Cormier et al. | |
| 2012/0158580 A1 | 6/2012 | Eram et al. | |
| 2012/0203824 A1* | 8/2012 | Oommen | 709/203 |
| 2012/0208511 A1 | 8/2012 | Vanderlinden et al. | |
| 2012/0230587 A1 | 9/2012 | Arseneau | |
| 2012/0260095 A1 | 10/2012 | Von Hauck et al. | |
| 2012/0276872 A1* | 11/2012 | Knauth et al. | 455/411 |
| 2012/0282891 A1 | 11/2012 | Mohammed et al. | |
| 2012/0282924 A1 | 11/2012 | Tagg et al. | |
| 2013/0023235 A1 | 1/2013 | Fan et al. | |
| 2013/0031191 A1 | 1/2013 | Bott | |
| 2013/0031234 A1* | 1/2013 | Alfano et al. | 709/223 |
| 2013/0046951 A1 | 2/2013 | Jones | |
| 2013/0065578 A1 | 3/2013 | Raleigh et al. | |
| 2013/0072168 A1 | 3/2013 | Colucciello et al. | |
| 2013/0085914 A1 | 4/2013 | McPherson et al. | |
| 2013/0111461 A1 | 5/2013 | Zubas et al. | |
| 2013/0198567 A1 | 8/2013 | Ahmed et al. | |
| 2013/0222395 A1 | 8/2013 | Blas, Jr. | |
| 2013/0303142 A1 | 11/2013 | Burcham et al. | |
| 2013/0310003 A1 | 11/2013 | Sadhvani et al. | |
| 2013/0311836 A1 | 11/2013 | Hurst et al. | |
| 2014/0045483 A1 | 2/2014 | Whidden | |
| 2014/0080467 A1 | 3/2014 | Urbanek | |
| 2014/0113610 A1 | 4/2014 | Ramprasad et al. | |
| 2014/0206313 A1 | 7/2014 | Spanel et al. | |
| 2014/0228012 A1 | 8/2014 | Annan et al. | |
| 2014/0228042 A1 | 8/2014 | Annan et al. | |
| 2014/0274032 A1 | 9/2014 | Shipley et al. | |
| 2014/0373184 A1 | 12/2014 | Mahaffey et al. | |
| 2015/0065105 A1 | 3/2015 | Masterson et al. | |
| 2015/0111564 A1 | 4/2015 | Urbanek | |
| 2015/0111565 A1 | 4/2015 | Urbanek | |

FOREIGN PATENT DOCUMENTS

| | | |
|---|---|---|
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | W02015060965 A2 | 4/2015 |

OTHER PUBLICATIONS

Notice of Allowance dated Nov. 22, 2014, U.S. Appl. No. 13/744,861, filed Jan. 18, 2013.

First Action Interview Pre-Interview Communication dated Oct. 22, 2014, U.S. Appl. No. 13/763,428, filed Feb. 8, 2013.

Notice of Allowance dated Dec. 29, 2014, U.S. Appl. No. 13/831,504, filed Mar. 14, 2013.

(56) References Cited

OTHER PUBLICATIONS

First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013 [15901].
Foreign Communication from a Related Counterpart—International Search Report and Written Opinion, dated Dec. 17, 2014, PCT/US14/46773, filed on Jul. 16, 2014 [36501].
Foreign Communication from a Related Counterpart—International Search Report and Written Opinion, dated Dec. 30, 2014, PCT/US14/56778, filed Sep. 22, 2014, [35501].
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014 [28801].
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014,PCT/US14/16650, filed on Feb. 16, 2014.

(56) References Cited

OTHER PUBLICATIONS

Urbanek, Robert E., "Delivery of Branding Content and Customizations to a Mobile Communication Device", filed , 201, International Serial No. PCT/US14/56778.

First Action Interview Office Action dated Mar. 16, 2015, U.S. Appl. No. 13/468,028, filed May 9, 2013.

Office Action dated Mar. 2, 2015, U.S. Appl. No. 13/622,234, filed Sep. 18, 2012.

FAIPP Pre-Interview Communication dated Mar. 26, 2015, U.S. Appl. No. 14/522,586, filed Oct. 24, 2014.

FAIPP Pre-Interview Communication dated Apr. 8, 2015, U.S. Appl. No. 13/844,104, filed Mar. 15, 2013.

Notice of Allowance dated Mar. 20, 2015, U.S. Appl. No. 13/763,428, filed Feb. 8, 2013.

Notice of Allowance dated Mar. 26, 2015, U.S. Appl. No. 13/763,434, filed Feb. 8, 2013.

FAIPP Pre-Interview Communication dated Mar. 12, 2015, U.S. Appl. No. 13/972,827, filed Aug. 21, 2013.

Notice of Allowance dated Jan. 22, 2015, U.S. Appl. No. 13/899,566, filed May 21, 2013.

FAIPP Pre-Interview Communication dated Apr. 15, 2015, U.S. Appl. No. 14/060,712, filed Nov. 20, 2013.

FAIPP Pre-Interview Communication dated Mar. 4, 2015, U.S. Appl. No. 14/010,518, filed Aug. 27, 2013.

FAIPP Pre-Interview Communication dated Apr. 3, 2015, U.S. Appl. No. 14/010,523, filed Aug. 27, 2013.

FAIPP Pre-Interview Communication dated Mar. 10, 2015, U.S. Appl. No. 14/010,524, filed Aug. 27, 2013.

FAIPP Pre-Interview Communication dated Apr. 8, 2015, U.S. Appl. No. 14/157,507, filed Jan. 16, 2014.

Foreign Communication from a Related Counterpart—International Preliminary Report on Patentability, dated Apr. 2, 2015, PCT/US13/55023, filed on Aug. 15, 2013.

Ghoshal, Jagannath, et al., "Multi-Step Mobile Device Initiation with Intermediate Partial Reset," filed Aug. 21, 2013, U.S. Appl. No. 13/972,827.

Delker, Jason R., et al. "Subscriber Identity Module (SIM) Card Initiation of Custom Application Launcher Installation on a Mobile Communication Device," filed Mar. 4, 2015, U.S. Appl. No. 14/639,056.

Delker, Jason R., et al. "Network Access Tiered Based on Application Launcher Installation," filed Mar. 4, 2015, U.S. Appl. No. 14/639,060.

FAIPP Pre-Interview Communication dated Jun. 2, 2015, U.S. Appl. No. 14/152,627, filed Jan. 10, 2013.

Notice of Allowance dated Jul. 7, 2015, U.S. Appl. No. 14/522,586, filed on Oct. 24, 2014.

FAIPP Pre-Interview Communication dated Apr. 23, 2014, U.S. Appl. No. 13/763,443, filed Feb. 8, 2013.

First Action Interview Office Action dated Jun. 16, 2014, U.S. Appl. No. 13/763,443, filed Feb. 8, 2013.

Office Action dated Jun. 16, 2015, U.S. Appl. No. 13/899,567, filed May 22, 2013.

Notice of Allowance dated May 7, 2015, U.S. Appl. No. 13/972,827, filed on Aug. 21, 2013.

Notice of Allowance dated May 29, 2015, U.S. Appl. No. 14/085,474, filed on Nov. 20, 2013.

Notice of Allowance dated May 8, 2015, U.S. Appl. No. 14/010,518, filed on Aug. 27, 2013.

Notice of Allowance dated Jun. 26, 2015, U.S. Appl. No. 14/010,523, filed on Aug. 27, 2013.

Notice of Allowance dated Apr. 28, 2015, U.S. Appl. No. 14/010,524, filed on Aug. 27, 2013.

Restriction Requirement dated May 21, 2015, U.S. Appl. No. 14/073,321, filed Nov. 6, 2013.

FAIPP Pre-Interview Communication dated Jul. 8, 2015, U.S. Appl. No. 14/475,399, filed Sep. 2, 2014.

Amazon Kindle e-book reader, on public sale 2007, http://en.wikipedia.org/wiki/Amazon_Kindle. last accessed on Apr. 13, 2015.

\* cited by examiner

SEGMENTED CUSTOMIZATION PACKAGE WITHIN DISTRIBUTED SERVER ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

After its manufacture, a mobile communication device may be delivered to a retail location where it may be purchased by a mobile communication device user. Following its purchase, the mobile communication device may be activated by the mobile communication device user. Once activated, the mobile communication device may have access to a network. While activated with access to the network, the mobile communication device may engage in periodic handshaking with base transceiver stations in which information may be sent to and/or received from the base transceiver stations. The mobile communication device may receive customization information from a server and may use its network access to pull down the customization information.

SUMMARY

In an embodiment, a method of making customization changes on a mobile communication device is disclosed. The method comprises identifying, on the mobile communication device, the bandwidth of a bearer channel of the mobile communication device, and selecting at least one server from which to request a customization payload based at least in part on the bandwidth of the bearer channel of the mobile communication device, wherein different servers are configured to access different portions of the customization package. The method further comprises sending a request for the customization payload to the selected server, receiving the customization payload from the selected server, and performing customization changes on the mobile communication device in response to receiving customization information contained in the customization payload.

In an embodiment, a mobile communication device is disclosed. The mobile communication device comprises a processor, a memory, a radio frequency transceiver, and an application stored in the memory, configured to identify the bandwidth of a bearer channel to which the mobile communication device is connected based on information received from the radiofrequency transceiver, and select at least one server configured to access at least a portion of a customization package from which to request a customization payload based at least in part on the bandwidth of the bearer channel to which the mobile communication device is connected, wherein different servers comprise different portions of the customization package. The application is further configured to send a request for the customization payload to the selected server, receive the customization payload, and perform customization changes in response to receiving customization information contained in the customization payload.

In an embodiment, a method of receiving a customization payload on a mobile communication device is disclosed. The method comprises identifying, on the mobile communication device, the bandwidth of a bearer channel of the mobile communication device, sending a request for a customization payload comprising at least a portion of a customization package to at least one of a plurality of servers that each comprises a portion of the customization package based at least in part on the bandwidth of the bearer channel of the mobile communication device, and receiving the customization payload.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
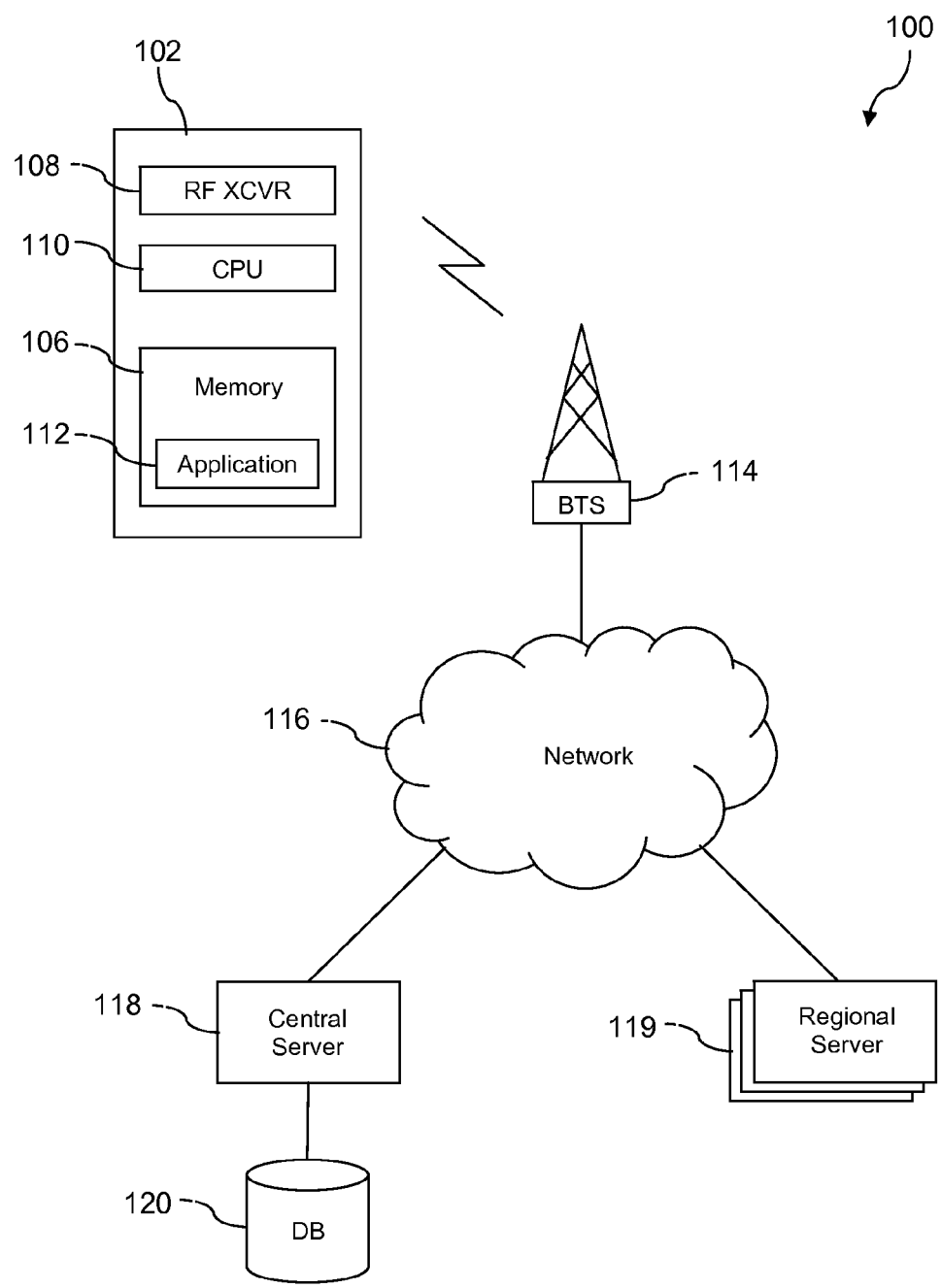
FIG. 1 illustrates a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a method of making customization changes on a mobile communication device. A customization package configured to be delivered to the mobile communication device may be stored in a network, for example, on a server and/or in a data store accessible via the network. The customization package may comprise configuration items to promote voice and data communication and links and/or references to contacts such as a customer care number, an application store, a voicemail store, and/or to other contacts. The customization package may further comprise media files such as audio tones, video animations, wallpaper, and the like.

In an embodiment, the customization package may be divided into a plurality of portions, for example, a primary portion, a secondary portion, and a tertiary portion. In some cases, the portions may be of different sizes, for example, the primary portion may be relatively small, the secondary portion may be of moderate size, and the tertiary portion may be large. The primary portion may comprise high priority customization information, the secondary portion may comprise customization information of lower priority than the customization information contained in the primary portion, and the tertiary portion may comprise customization information of lower priority than the customization information contained in the secondary portion. In an embodiment, customization information may be assigned priority based on its contribution to the basic functionality of the mobile communication device. For example, information that plays a large role in the basic functionality of the mobile communication device may be assigned high priority and information with little to no role in the basic functionality of the mobile communication device may be assigned low priority.

In some cases, a portion of the customization package comprising higher priority customization information than another portion of the customization package may be said to be the higher priority portion of the two portions of the customization package being compared. Thus, the primary portion of the customization package may be of higher priority than the secondary portion of the customization package which may be of higher priority than the tertiary portion of the customization package. The portions of the customization package may be configured to be delivered to the mobile communication device in an order reflecting their priority when the bandwidth of the bearer channel to which the mobile communication device is connected limits the delivery of all three portions to the mobile communication device at once.

Delivering the customization package as a plurality of portions may provide advantages over delivering the customization package as a monolith. Delivering the customization package as a plurality of portions may place less load on the network than delivering the customization package as a monolith. Thus, undesirable consequences of an overloaded network, for example, raising the latency of other devices served by the same base transceiver station as the mobile communication device and dropped calls may be reduced by delivering the customization package as a plurality of portions. In some cases, delivering the customization package as a plurality of portions may reduce expense by allowing one or more portions to be delivered over cheaper or otherwise more efficient channels that may be unavailable for delivery of the customization package as a monolith.

Additionally, delivering the customization package as a plurality of portions may prevent an undesirable delay in availability of basic functionality of the mobile communication device that may arise when the customization payload is delivered as a monolith. Large customization payloads are a relatively recent phenomenon brought about by inclusion of animations and other media files. Some customization packages may be as large as 50 megabytes or more, and in some cases, with most of the size coming from media files not required for basic functionality. In some cases, higher priority portions of the customization package may be configured to be delivered before portions of the customization package that are of lower priority.

For example, in the case that the mobile communication device is unable to receive more than one portion of the customization package at a time due to the bandwidth of the bearer channel to which it is connected, the highest priority portion, e.g., the primary portion of the customization package may be the first portion delivered to the mobile communication device. In the case that the mobile communication device is connected to a bearer channel of sufficient bandwidth for two portions of the customization package to be delivered at once, then the primary and secondary portion of the customization package may be delivered at approximately the same time or in order of priority. Alternatively, the two portions may be delivered in a different order if it can be determined that both portions will be received by the mobile communication device within a desirable time period. If the mobile communication device is connected to a bearer channel of sufficient bandwidth for all three portions of the customization package to be delivered at once, then the three portions may be delivered in a substantially similar manner to the primary and secondary portions described immediately above.

In the example above, the primary portion, the secondary portion, and the tertiary portion of the customization package may be distributed to one or more servers in the network. In an embodiment, a complete version of the customization package may remain accessible at a server location on the network despite the distribution of the primary, secondary, and tertiary portions to one or more servers. The complete version and/or the primary portion of the customization package may be stored on a central server while the secondary and tertiary portions of the customization package may be stored on regional servers.

The mobile communication device may gain access to the network by connecting to a bearer channel. Different networks, different service plans, and/or different grades of service subscribed to by a user may comprise different bearer channels, wherein different bearer channels may provide different levels of bandwidth. For example, a 1xRTT (Radio Transmission Technology) channel may provide up to about 144 kilobits per second (kbps), while an EV-DO (Evolution Data Optimized) channel may provide up to about 3.1 megabits per second (Mbps). Other channels, such as Long Term Evolution (LTE) channels, may provide more bandwidth than EV-DO provides. The mobile communication device may identify the bandwidth of the bearer channel to which it is connected and request a customization payload from a server selected based on the bandwidth of the bearer channel to which the mobile communication device is connected. The customization payload may comprise a portion of the customization package, wherein the portion comprises customization information contained in the customization package.

The server may be selected such that higher priority portions of the customization package may be received before lower priority portions of the customization package. For example, a server that provides access to the primary portion of the customization payload may be selected when the mobile communication device is connected to a bearer channel whose bandwidth limits the mobile communication device from receiving more than one portion of the customization package at a time. The mobile communication device may make customization changes in response to receiving customization information contained in the customization payload, for example, the mobile communication device may provide a phone number for customer care in an address book of the mobile communication device.

It is anticipated that dividing the customization package into portions that may be sent in order of priority may allow the mobile communication device to obtain high priority customization information quickly and to promptly make customization changes in priority order based on that information. Distributing the portions of the customization package between central and regional servers may help to unburden the network. In some cases, different mobile communication devices may receive customization payloads based on the bearer channels to which they are connected. For example, a first mobile communication device connected to a 1xRTT bearer channel may receive a customization payload comprising only the primary portion of the customization package while a second mobile communication device connected to an LTE bearer channel may receive a customization payload comprising the primary, secondary, and tertiary portions of the customization payload.

Turning now to FIG. 1, a communication system 100 is described. In an embodiment, the communication system 100 comprises a mobile communication device 102, a base transceiver station (BTS) 114, a network 116, a central server 118, a plurality of regional servers 119, and a data store 120. The mobile communication device 102 comprises a radio frequency transceiver (RF XCVR) 108, a processor (CPU) 110, and a memory 106. The memory 106 comprises an application 112. In an embodiment, the mobile communication device 102 may comprise a mobile phone, a personal digital assistant (PDA), a media player, a laptop computer, a notebook computer, a tablet computer, a pager, a personal navigation assistant, a smart phone, a feature phone, a telematics unit in a vehicle, or something else.

In an embodiment, a customization package may be stored at a location accessible through the network 116. The customization package may comprise power-on animations, power-off animations, wallpaper, a ringtone, a link to an application store, carrier legal statements, such as terms and conditions, multimedia preloaded responses, coverage maps, a mobile directory number, a network access identifier, a short code or phone number of a customer care center, a short code or phone number of voice mail, one or more applications, one or more widgets, one or more sets of instructions or programs that execute to complete rebranding, customizing, and/or provisioning the mobile communication device 102, activation information, and/or other information. In some contexts, the information contained in the customization package may be referred to as customization information.

The customization package may be divided into one or more portions. The portions of the customization package may be ranked in priority order according to the customization information that they contain, wherein high priority customization information is contained in high priority portions of the customization package. High priority customization information may comprise customization information used to establish basic operation of the mobile communication device 102. For example, placing a phone call may be a basic operation of the mobile communication device 102, and customization information used to enable that functionality may be high priority information. In some cases, the more integral a piece of customization information is to enabling a basic operation such as a phone call, the higher priority it may be given. For example, a coverage map may be given higher priority than a wallpaper media file.

Portions of the customization package may be configured to be sent to the mobile communication device 102 in priority order, wherein higher priority portions of the customization package are sent to the mobile communication device 102 earlier than are lower priority portions of the customization package. In an embodiment, the customization package may be stored as a single portion; or alternatively, the customization package may be divided into two portions, three portions, four portions, five portions, six portions, seven portions, eight portions, nine portions, ten portions, or some other number of portions. The one or more portions of the customization package may be stored at a single location accessible through the network 116; or alternatively, the one or more portions of the customization package may be distributed to more than one location accessible through the network 116. In an embodiment, the multiple partitioning granularities of the customization package may be provided concurrently.

For example, the customization package may be divided into three partitioning granularities: a complete customization package, two halves of the customization package, and three thirds of the customization package, wherein each partitioning granularity comprises the same totality of customization elements. In the example provided, the mobile communication device may select which of the partitioning granularities to receive based on the bandwidth of the bearer channel to which it is connected. For example, when the mobile communication device 102 is connected to a 1xRTT bearer channel, the mobile communication device 102 may select the partitioning granularity wherein the customization package is divided into thirds.

In an embodiment, the customization package may be divided into three portions: a primary portion, a secondary portion, and a tertiary portion. The primary portion of the customization package may comprise higher priority customization information than is contained in either one of the secondary and tertiary portions of the customization package, the secondary portion of the customization package may comprise customization information of higher priority than the customization information contained in the tertiary portion of the customization package, and the tertiary portion of the customization package may comprise customization information of lower priority than the customization information stored in either one of the primary and secondary portions of the customization package. Thus, in some contexts, the primary portion of the customization package may be considered to have higher priority than the secondary portion of the customization package which may be considered to have higher priority than the tertiary portion of the customization package.

In an embodiment, the primary portion of the customization package may comprise a network access identifier, a mobile directory number, coverage maps, other things, or combinations thereof. Coverage maps may be comprise coverage information for example preferred roaming lists and other lists. The secondary portion of the customization package may comprise carrier legal statements, such as terms and conditions, multimedia preloaded responses, ringtones, wallpaper, other things, or combinations thereof. The tertiary portion of the customization package may comprise animation updates, ringtones, user guidelines, and/or other customization information. Alternatively, these customization elements may be incorporated into other portions. For example, in an embodiment, a user's guide may be incorporated into the primary portion of the customization package so that a user may read or obtain helpful usage instructions earlier in the customization cycle.

In an embodiment, the primary portion of the customization package may be stored on the central server 118 or in the data store 120. In some cases, the primary portion of the customization package may be stored exclusively on the central server 118 or in the data store 120. The secondary and tertiary portions of the customization package may be stored on the regional server 119. A complete version of the customization package may be stored on the central server 118, in the data store 120, or in some other location accessible from the network 116. In the case that the customization package is divided into more than three portions, the portion comprising the highest priority customization information may be stored on the central server 118 or in the data store 120 while the other portions are stored on the regional server 119. Storing a portion of the customization package on the central server 118 may help to prevent inconsistent provisioning states, e.g., assigning the same unique provisioning value to two different mobile communication devices 102, and distributing portions of the customization package may reduce the load on the central server 118 and may reduce network traffic.

In an embodiment, the mobile communication device 102 may be configured to request the customization package. In some cases, the mobile communication device 102 may be a new, out of the box device when it makes the request for the customization package. Alternatively, the mobile communication device 102 may be at some other stage in its life when it makes the request for the customization package. In an embodiment, the processor 110 may execute the application 112 stored in the memory 106 in order to request the customization package. The mobile communication device 102 may identify and/or determine the bandwidth of a bearer channel to which it is connected based on information received by the radio frequency transceiver 108. The application 112 may send a request for the customization package, a portion of the customization package, a customization payload, wherein the customization payload comprises at least a portion of the customization package, or for something else.

In an embodiment, the request may be sent to a location from which the mobile communication device 102 may receive the customization payload directly; or alternatively, the request may be sent to a location, such as a regional home agent (HA), configured to reroute the request to a location from which the mobile communication device 102 may receive the customization payload. In some contexts, requesting the customization payload through an intermediate, such as a regional home agent, may be considered requesting the customization payload from the location to which the request is rerouted by the intermediate. In an embodiment, the request may comprise information analyzed by the intermediate that may play a role in determining which location it is rerouted to.

For example, the request may comprise information indicating that the mobile communication device 102 is connected to a bearer channel of insufficient bandwidth to support receiving multiple portions of the customization package at once when the mobile communication device 102 is connected to a 1xRTT channel. In this case, the intermediate may reroute the request to a location, such as the central server 118, from which the mobile communication device 102 may receive high priority customization information. Alternatively, when the mobile communication device 102 is connected to a bearer channel such as an EV-DO or LTE channel, the request may comprise information indicating that the mobile communication device is connected to a bearer channel of sufficient bandwidth to support receiving more than one portion of the customization package at once.

In an embodiment, the application 112 may identify and/or select a location on the network 116 from which it may request and receive a customization payload based at least in part on the bandwidth of the bearer channel to which the mobile communication device 102 is connected. The application 112 may be configured to request portions of the customization package in order of their priority. In some contexts, requesting a portion of the customization package and requesting a customization payload may be substantially similar. A portion of the customization package may comprise any division of the customization package or the whole customization package.

The application 112 may send a request for a customization payload comprising a portion of the customization package to the central server 118, wherein the central server 118 comprises the primary portion of the customization package which may be the portion of the customization package of the highest priority. Alternatively, when the bandwidth of the bearer channel can support the mobile communication device 102 receiving multiple portions of the customization package at once, the application 112 may send a request for a customization payload to more than one location on the network 116 such that the mobile communication device 102 may receive multiple portions of the customization package that may have been distributed to multiple locations on the network 116. For example, the application 112 may send a request for a customization payload to both the central server 118 and regional server 119, wherein the central server 118 may send the primary portion of the customization package to the mobile communication device 102, and the regional server 119 may send the secondary portion of the customization package to the mobile communication device 102.

In an embodiment, the application 112 may be configured to make customization changes to the mobile communication device 102 in response to customization information contained in a customization payload received by the mobile communication device 102. Customization changes may comprise providing power-on animations and/or power-off animations, changing wallpaper, changing a ringtone, providing a link to an application store, entering a short code or phone number of a customer care center into an address book of the mobile communication device 102, providing a short code or phone number of voice mail, installing one or more applications and/or one or more widgets, and/or executing one or more sets of instructions or programs configured to complete rebranding, customizing, and/or provisioning the mobile communication device 102. In an embodiment, customization changes may be made such that a brand is configured into the mobile communication device 102. The brand may be configured into a previously unbranded mobile communication device 102. Alternatively, the customization changes may comprise changing the brand of a currently branded mobile communication device 102.

Figure 2:
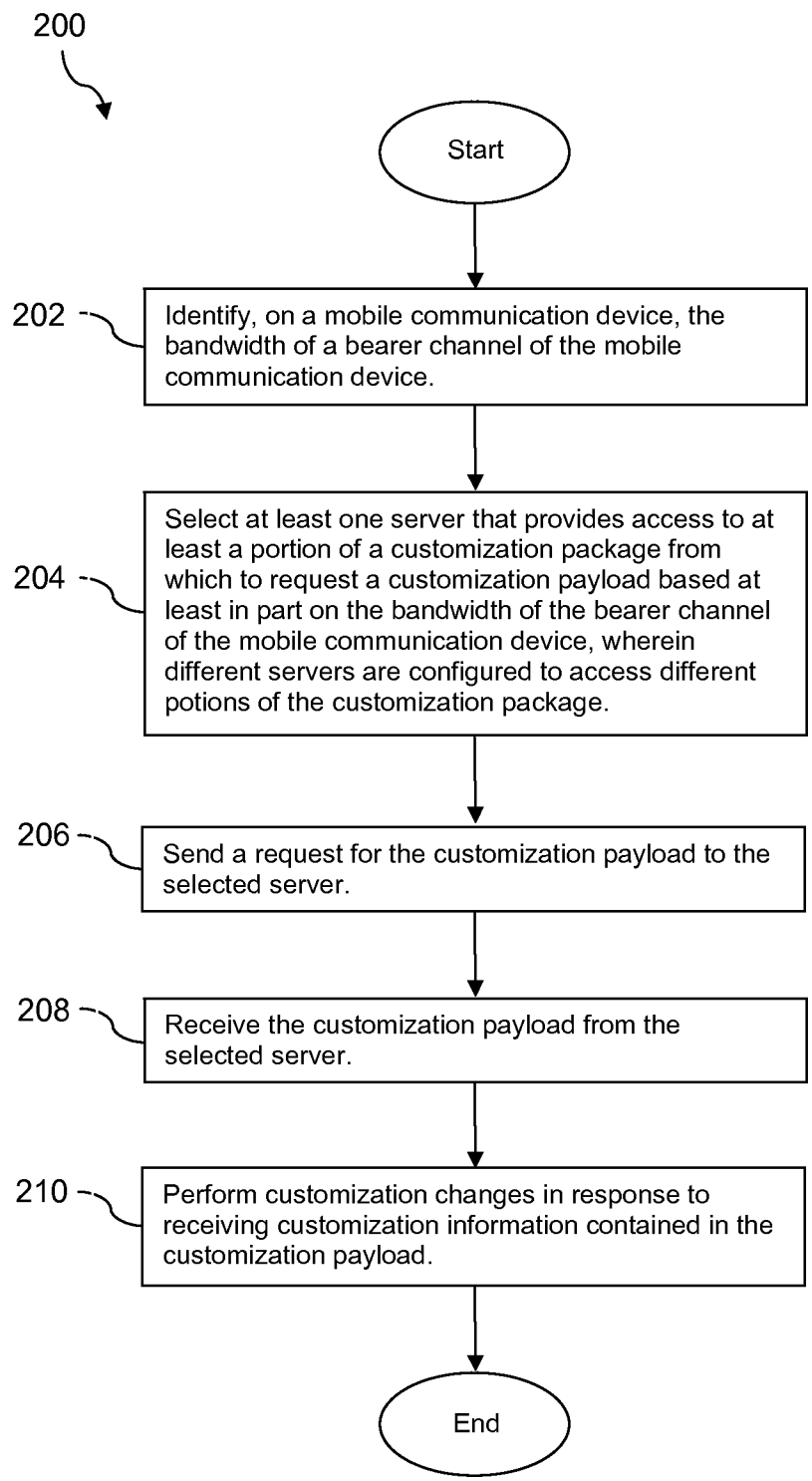
FIG. 2 is a flow chart of a method according to an embodiment of the disclosure.

Turning now to FIG. 2, a method 200 is described. In an embodiment, the method 200 may be implemented by one or more components of the communication system 100 described hereinabove with reference to FIG. 1. At block 202, the bandwidth of a bearer channel of a mobile communication device may be identified on the mobile communication device. At block 204, a selection of at least one server, configured to provide access to at least a portion of a customization package, from which a request for a customization payload may be made based at least in part on the bandwidth of the bearer channel of the mobile communication device, wherein different servers provide access to different portions of the customization package. In some cases, portions of the customization package may be accessed by the server.

As discussed hereinabove with reference to FIG. 1, the customization package may be divided into multiple portions that may be distributed to different server locations. The bandwidth of the bearer channel to which the mobile communication device is connected may be used by the mobile communication device to determine how many portions of the customization package the mobile communication device can receive at one time. In this case, it may be desirable for the mobile communication device to receive higher priority portions of the customization package before lower priority portions of the customization package. Thus, the selected servers may be the servers from which the mobile communication device may receive the highest priority portions of the customization package. For example, the mobile communication device may select a central server from which it may receive a primary portion of the customization package when the mobile communication device is connected to a 1xRTT channel.

In some cases, the mobile communication device may select more than one server from which to request customization payloads when the mobile communication device is connected to a bearer channel of sufficient bandwidth to support multiple customization payloads being sent at the same time. For example, the mobile communication device may select both a central server and a regional server when the mobile communication device is connected to an EV-DO channel or an LTE channel. In some cases, the selection may occur through an intermediate as described hereinabove with reference to FIG. 1.

The request for the customization payload may be sent to the selected server at block 206. As described hereinabove with reference to FIG. 1, in some contexts, rerouting the request to the selected server through an intermediate may be considered substantially similar to sending the request directly to the selected server. The mobile communication device may receive the customization payload from the selected server at block 208. Customization changes may be performed by the mobile communication device at block 210 in response to receiving customization information contained in the customization payload. Customization changes may comprise installing and/or loading power-on animations and/or power-off animations, changing wallpaper, changing a ringtone, configuring a link to an application store, entering a short code or phone number of a customer care center into an address book of the mobile communication device, configuring a short code or phone number of voice mail, installing one or more applications and/or one or more widgets, and/or executing one or more sets of instructions or programs configured to complete rebranding, customizing, and/or provisioning the mobile communication device.

Figure 3:
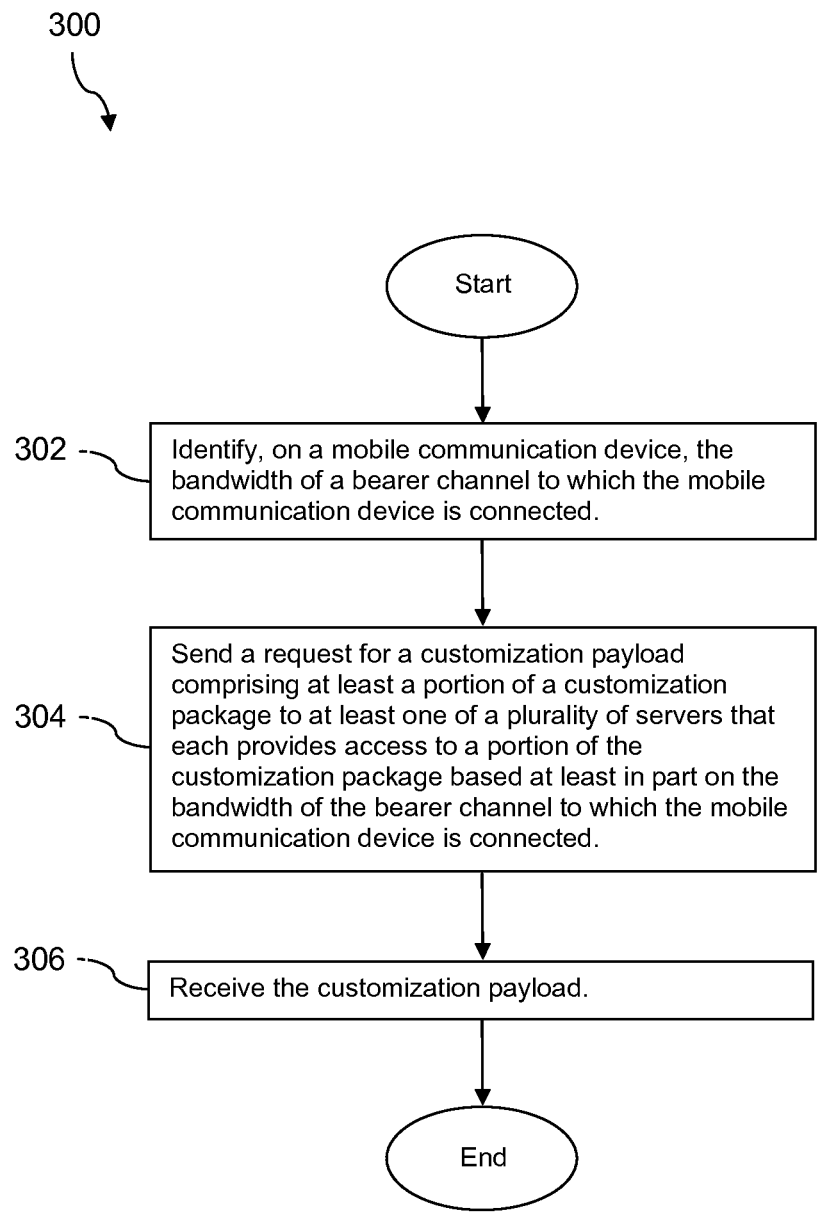
FIG. 3 is a flow chart of a method according to an embodiment of the disclosure.

Turning now to FIG. 3, a method 300 is described. In an embodiment, the method 300 may be implemented by one or more components of the communication system 100 described hereinabove with reference to FIG. 1. At block 302, the bandwidth of a bearer channel to which a mobile communication device is connected may be identified. A request for a customization payload that comprises at least a portion of a customization package may be sent at block 304 to at least one of a plurality of servers that each provides access to a portion of the customization package based at least in part on the bandwidth of the bearer channel to which the mobile communication device is connected.

In an embodiment, the customization package may be divided into a primary portion, a secondary portion, and a tertiary portion as described hereinabove with reference to FIG. 1, and each portion may be distributed to servers as described hereinabove with reference to FIG. 1. The mobile communication device may receive the customization payload at block 306. In an embodiment, the mobile communication device may make customization changes as described hereinabove in response to customization information contained in the customization payload.

Figure 4:
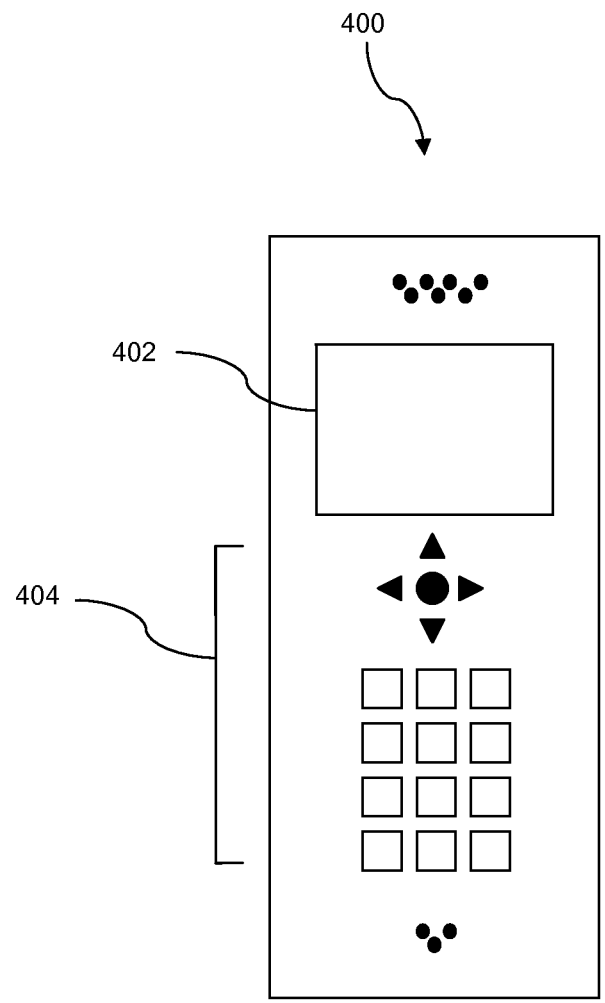
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
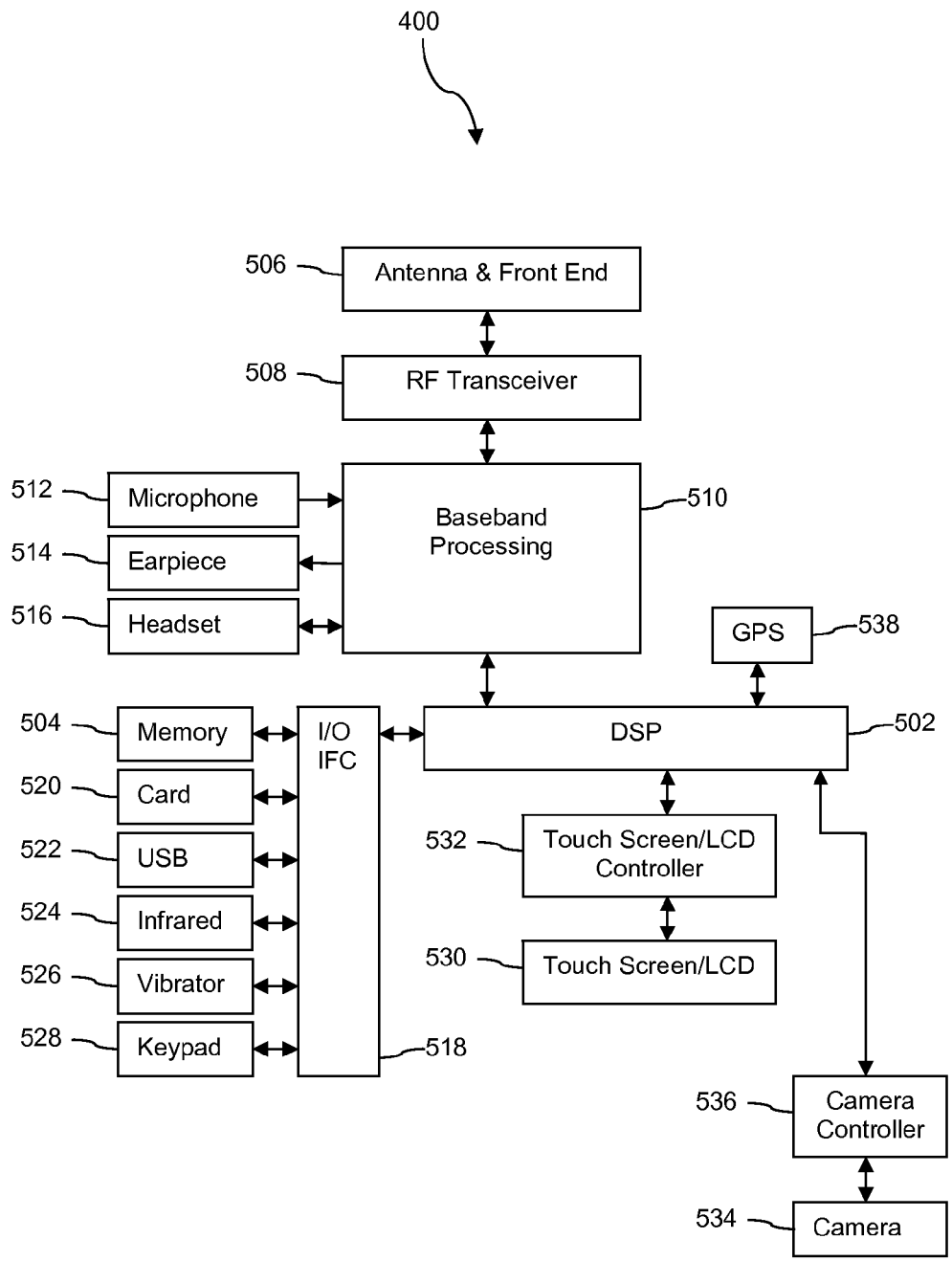
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
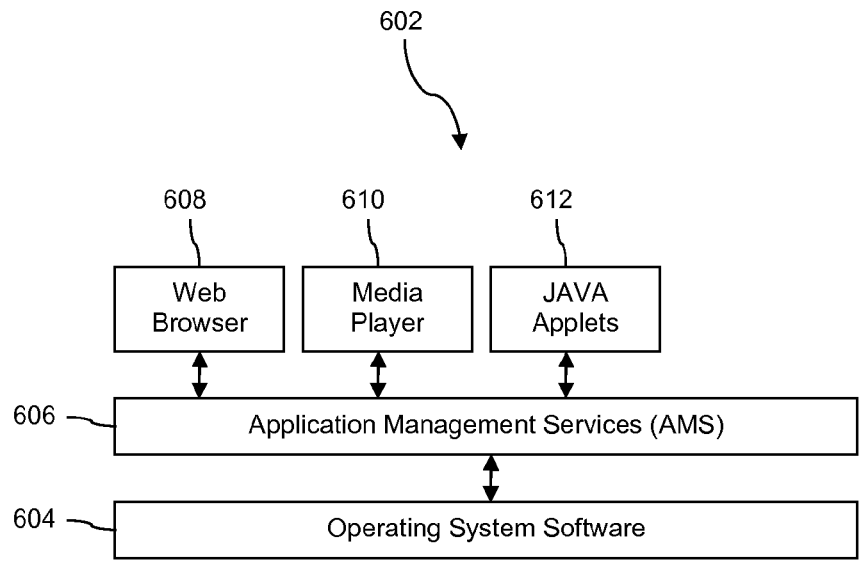
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
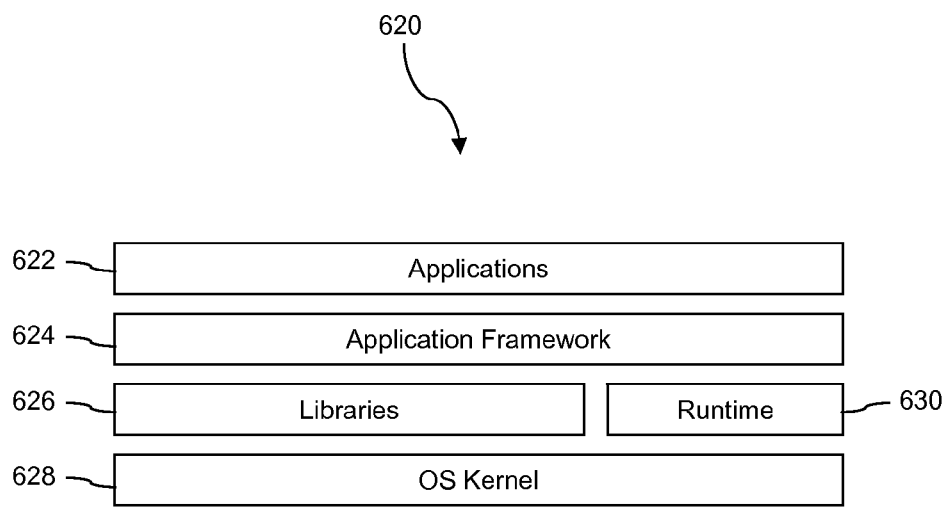
FIG. 6B is a block diagram of another software architecture according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
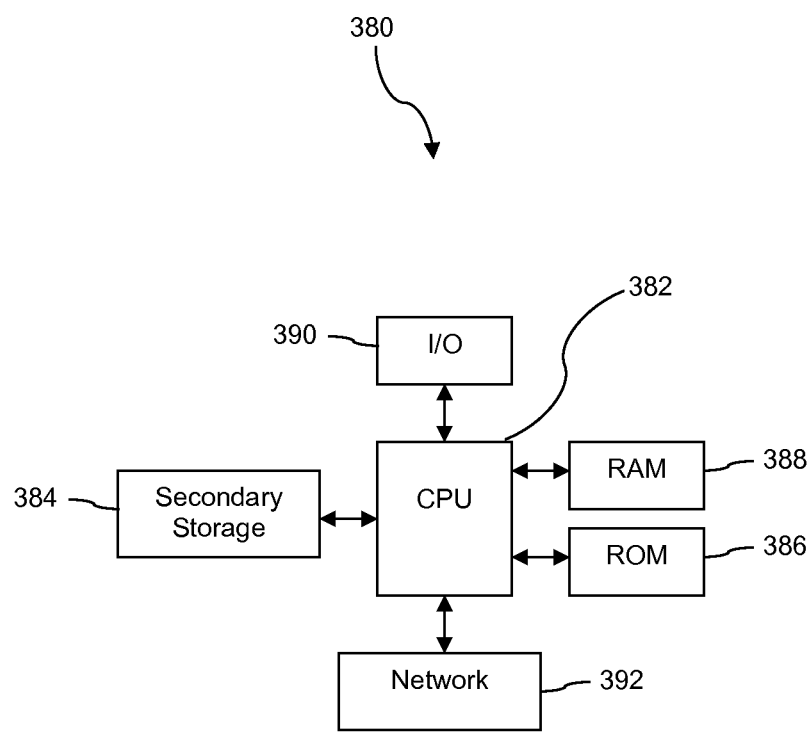
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of making customization changes on a mobile communication device, comprising:

identifying, by an application stored in a non-transitory memory and executed to configure a processor on the mobile communication device, a bandwidth of a bearer channel connecting the mobile communication device with a network;

determining, by the application, a portion of a customization package to request based on identification of the bandwidth of the bearer channel;

selecting, by the application, a server from a plurality of servers based at least in part on the determination of the portion of the customization package and identification of the bandwidth of the bearer channel of the mobile communication device, wherein at least two servers of the plurality of servers are configured to access different portions of the customization package;

sending, by the application, a request for the portion of the customization package to the server based on the selecting, wherein the request comprises identity information of the server selected;

receiving, on the mobile communication device by the application, the portion of the customization package from the server in response to sending the request; and performing, by the application, customization changes on the mobile communication device based on customization information contained in the portion of the customization package.

2. The method of claim 1, wherein the server is configured to access the portion of the customization package in a non-transitory memory at a location on the network, wherein the portion of the customization package is one of a primary portion, a secondary portion, or a tertiary portion of the customization package.

3. The method of claim 2, wherein the primary portion of the customization package comprises customization information of the highest priority, the secondary portion of the customization package comprises customization information of intermediate priority, and the tertiary portion of the customization package comprises customization information of lower priority than the customization information contained in either of the primary portion and the secondary portion of the customization package.

4. The method of claim 2, wherein a central server is configured to access the primary portion of the customization package.

5. The method of claim 4, wherein the server is the central server based on the portion of the customization package being the primary portion in response to the bandwidth being identified as corresponding to a 1XRTT (Radio Transmission Technology) bearer channel connecting the mobile communication device with the network.

6. The method of claim 4, wherein at least one of the plurality of servers is a regional server that is selected in response to identifying the bandwidth of the bearer channel as at least that of an EV-DO (Evolution Data Optimized) bearer channel connection with the network.

7. The method of claim 2, wherein a regional server is configured to access at least one of the secondary portion of the customization package or the tertiary portion of the customization package, and the regional server is not configured to access the primary portion of the customization package.

8. The method of claim 1, wherein the request is sent via a regional home agent (HA) configured to reroute the request to the server based on the identifying information, wherein sending the request for the customization package comprises:

sending the request via the regional home agent (HA) for the server, wherein the HA is configured to reroute the request to the server.

9. A mobile communication device comprising:

a processor;

a non-transitory memory communicatively coupled with at least the processor;

a radio frequency transceiver; and an application stored in the non-transitory memory that, upon execution, configures the processor to:

identify a bandwidth of a bearer channel to which the mobile communication device is connected based on information received from the radio frequency transceiver, determine a portion of a customization package to request based on the bandwidth of the bearer channel, select a server from a plurality of servers based on the portion of the customization package, wherein the server is configured to access at least the portion of the customization package, and wherein at least two servers of the plurality of servers correspond with different portions of the customization package, send a request for the portion of the customization package to the server that is selected, the request comprising identifying information of the server, receive the portion of the customization package from the server in response to the request, and perform customization changes to the mobile communication device in response to customization information contained in the portion of the customization package.

10. The mobile communication device of claim 9, wherein the customization changes comprise at least three of: providing power-on animations, providing power-off animations, changing wallpaper, changing a ringtone, providing a link to an application store, entering a short code or phone number of a customer care center into an address book of the mobile communication device, providing a short code or phone number of voice mail, installing an application, installing a widget, or executing one or more sets of instructions configured to complete rebranding, customizing, or provisioning the mobile communication device.

11. The mobile communication device of claim 9, wherein the portion of the customization package is a primary portion.

12. The mobile communication device of claim 9, wherein customization information comprises information about at least three of: power-on animations, power-off animations, wallpaper information, ringtone information, information about a link to an application store, a short code of a customer care center, phone number of a customer care center, carrier legal statements, multimedia preloaded responses, coverage maps, a mobile directory number, a network access identifier, a short code of voice mail, a phone number of voice mail, information for installing an application or widget, instructions configured to complete rebranding, or provisioning information.

13. The mobile communication device of claim 9, wherein the request is sent through a regional home agent (HA) to the server.

14. A method of receiving a customization payload on a mobile communication device, comprising:

identifying, by an application stored in a non-transitory memory and executed to configure a processor on the mobile communication device, a bandwidth of a first bearer channel connecting the mobile communication device to a network;

determining, by the application, a first portion of a customization package from a plurality of portions of the customization package based on identifying the bandwidth of the first bearer channel;

selecting, by the application, a first server that corresponds with the first portion of the customization package in response to determining the first portion;

sending, by the application, a request for a first customization payload comprising the first portion of the customization package to the first server of a plurality of servers;

receiving, on the mobile communication device by the application, the first customization payload from the first server;

perform customization changes to the mobile communication device based on the first portion of the customization package in the first customization payload;

subsequent to performing customization changes based on the first portion, determining a second portion of the customization package from the plurality of portions based on identification of a second bandwidth of a different bearer channel that connects the mobile communication device with the network after connection to the first bearer channel ends;

selecting, by the application, a second server to request a second portion of the customization package based on the determination of the second portion;

sending, by the application, a second request for the second portion to a second server of the plurality of servers;

receiving, on the mobile communication device from the second server, a second customization payload comprising the second portion of the customization package in response to the second request, wherein receiving the second customization payload is based on the mobile communication device being connected to the different bearer channel after connection to the first bearer channel is ended; and performing additional customization changes to the mobile communication device based on the second portion of the customization package, wherein the additional customization changes are supplemental to the customization changes performed based on the first portion.

15. The method of claim 14, wherein each portion of the customization package comprises customization information that is used to perform customization changes.

16. The method of claim 15, wherein the customization changes comprise at least three of: providing power-on animations, providing power-off animations, changing wallpaper, changing a ringtone, providing a link to an application store, entering a short code or a phone number of a customer care center into an address book of the mobile communication device, providing a short code or phone number of voice mail, installing application, installing a widget, or executing instructions configured to complete rebranding, customizing, or provisioning the mobile communication device.

17. The method of claim 15, wherein the customization information comprises information about at least three of: power-on animations, power-off animations, wallpaper information, ringtone information, carrier legal statements, multimedia preloaded responses, coverage maps, a mobile directory number, a network access identifier, information about a link to an application store, a short code or phone number of a customer care center, a short code or phone number of voice mail, information for installing an application, information for installing a widget, instructions configured to complete rebranding of the mobile communication device, or provisioning information for the mobile communication device.

18. The method of claim 17, wherein each portion of the customization package comprises different customization information.

19. The method of claim 14, wherein at least one of the first request or the second request comprises identifying information for the corresponding server for routing through a regional home agent (HA).

20. The method of claim 1, wherein the first portion of the customization package is determined to be a primary portion based on the bandwidth of the bearer channel corresponding to a bandwidth of a 1XRTT (Radio Transmission Technology) bearer channel connection with the mobile communication device, wherein the primary portion of the customization package comprises a set of customization information configured to be sent to the mobile communication before other portions of the customization package are sent to the mobile communication device.

* * * * *